United States Patent [19]
Bassett

[11] Patent Number: 5,485,886
[45] Date of Patent: Jan. 23, 1996

[54] ADJUSTABLE AGRICULTURAL TOOL HOLDER

[75] Inventor: James H. Bassett, Sycamore, Ill.

[73] Assignee: Dawn Equipment Company, Sycamore, Ill.

[21] Appl. No.: 164,153

[22] Filed: Dec. 9, 1993

[51] Int. Cl.⁶ .............................. A01B 15/00; A01B 35/20
[52] U.S. Cl. .......................... 172/763; 172/762; 172/744; 172/773; 172/774
[58] Field of Search .................... 172/763, 762, 172/744, 773, 775, 774; 403/27, 329

[56] References Cited

U.S. PATENT DOCUMENTS

| | | | |
|---|---|---|---|
| 1,481,981 | 1/1924 | Bone | 403/109 |
| 3,351,139 | 11/1967 | Schmitz et al. | 172/602 |
| 3,711,974 | 1/1973 | Webb | 40/63 |
| 4,161,090 | 7/1979 | Watts, Jr. | 52/301 |
| 4,580,506 | 4/1986 | Fleischer et al. | 172/744 |
| 4,650,005 | 3/1987 | Tebben | 172/603 |
| 5,255,617 | 10/1993 | Williams et al. | 172/744 |
| 5,349,911 | 9/1994 | Holst et al. | 172/603 |

OTHER PUBLICATIONS

Photographs 1–3.

*Primary Examiner*—Terry Lee Melius
*Assistant Examiner*—Spencer Warnick
*Attorney, Agent, or Firm*—Arnold, White & Durkee

[57] ABSTRACT

A holder for an agricultural tool. The holder has a shaft with first structure at a first location for mounting at least one agricultural tool to the shaft. The shaft has a portion that is movable guidingly in first and second opposite directions relative to a support on which the holder is mounted. A second structure is integrally formed as one piece with the shaft to limit movement of the shaft portion in one of the first and second directions relative to a support on which the holder is mounted.

8 Claims, 3 Drawing Sheets

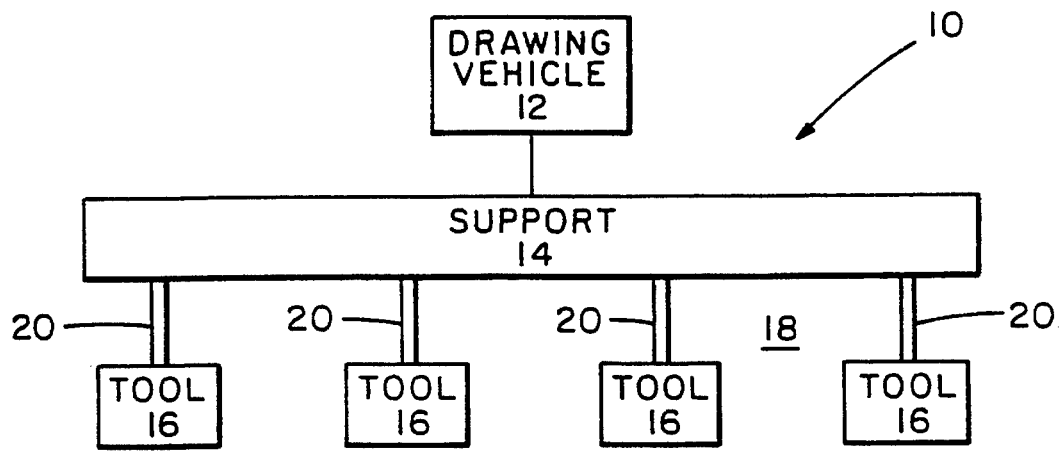
FIG. 1
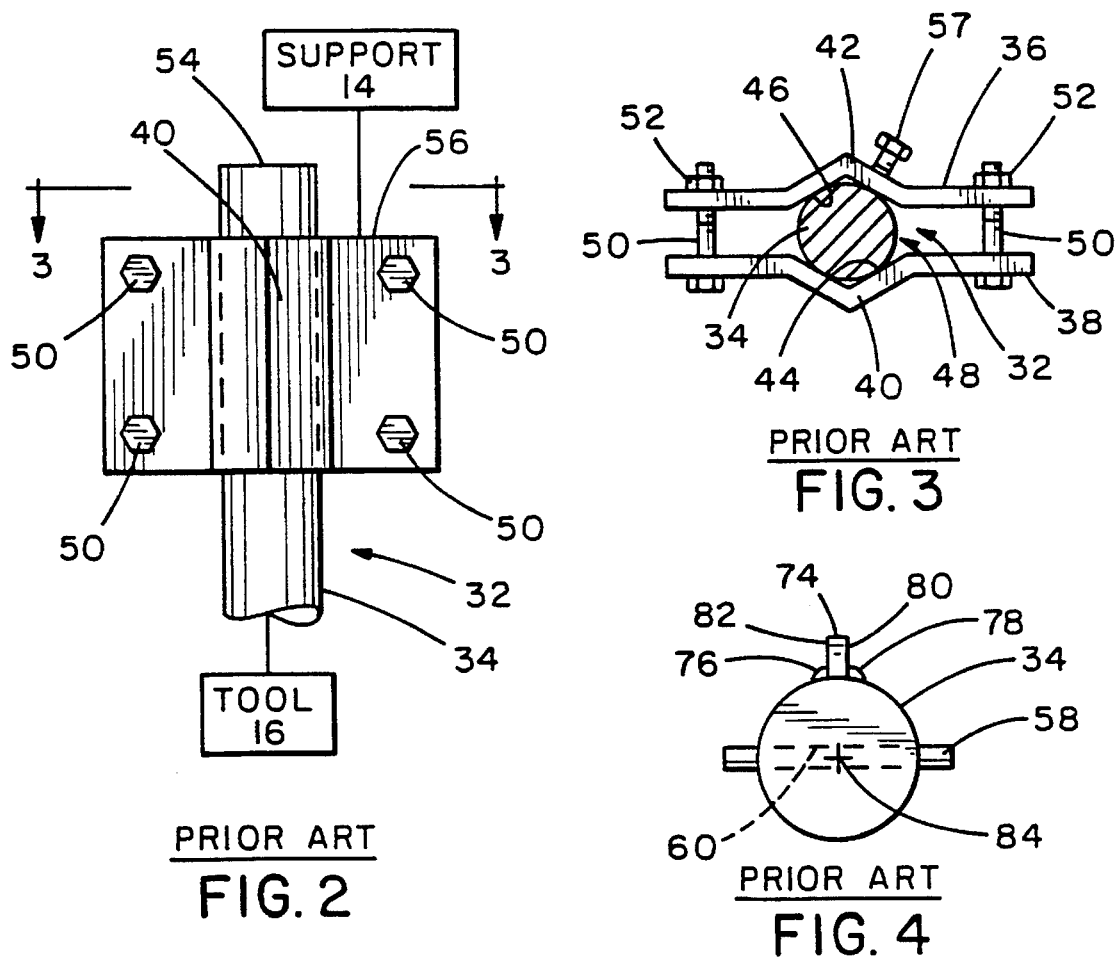
PRIOR ART
FIG. 2
PRIOR ART
FIG. 3
PRIOR ART
FIG. 4

ADJUSTABLE AGRICULTURAL TOOL HOLDER

BACKGROUND OF THE INVENTION

1. Field of the Invention

This invention relates to agricultural implements and, more particularly, to a holder for a soil working tool that is selectively adjustable in a vertical direction relative to a support therefor.

2. Background Art

It is known to mount soil working tools on a support so that the tools are selectively adjustable vertically relative to the support. A wide range of soil working tools are mounted in this fashion, among which are fertilizer/additive applicators, opening and closing wheels, residue resituating wheels, etc. These tools may be adjusted individually or in groups as dictated by the particular procedure, the terrain, the soil type, etc.

Typically, the holder is in the form of an elongate shaft, which may be straight or contoured. The bottom of the shaft is configured to carry one or a plurality of tools. The top of the shaft has a straight portion which is used to maintain the tool holder on the support.

Typically, the straight shaft portion is held captively between a pair of plates on the support. The plates are contoured so that they cooperatively define a receptacle to receive the straight shaft portion and allow the straight shaft portion to be guided vertically relative to the support plates.

A plurality of nuts and bolts are used to draw the plates towards each other. By tightening the bolts, the straight shaft portion is squeezed between the plates so that its vertical position is fixed. By loosening the nuts, the plates can be moved away from each other so that the straight shaft portion is allowed to slide vertically in guided fashion relative to the plates.

In its simplest state, the straight portion of the shaft, including the upper free end thereof, has a uniform cross section. By slightly loosening the bolts on the plates, the shaft free end can be directed upwardly from beneath the plates into the receptacle. When a desired heights for the holder is realized, the bolts on the plates are tightened to captively maintain the holder in a fixed position between the plates.

While this construction facilitates assembly of the holder, it introduces an element of danger. If the nuts on the plates are loosened, the holder with the tool(s) thereon can slide freely downwardly and separate from the support. Since the combined weight of the holder and tools may be significant, bodily injury may result from an inadvertent movement of the holder with the tools thereon. This is particularly a problem in the agricultural environment in which corrosion and foreign matter, such as soil and chemicals, may build up within the receptacle defined by the plates. The corrosion and foreign matter may cause the straight shaft portion to stick in the receptacle. As the user progressively loosens the nuts on the plates, the shaft may abruptly and unexpectedly break loose and fall.

To overcome the above problem, it is known to drill a through bore at the top of the holder to accept a deformable key or pin. Since the pin and key are relatively long, it may be impractical to pre-assemble the pin/key before mounting the holder. Consequently, the user typically directs the holder upwardly into the receptacle defined by the plates until the through bore is exposed at the top of the plates. The user then inserts the pin/key, and in the latter case effects the necessary shaping of the key to hold the key in place.

It is inconvenient to have to assemble the pin/key. If this procedure is performed by one person, the user risks dropping the holder and facing the aforementioned dangers. The pin/key also defines a sharp projection which could injure the user.

A still further problem associated with the pin/key is that the pin/key must have a relatively small diameter so that the accommodating bore will not significantly weaken the shaft. Consequently, the pin/key is prone to shearing as the holder slides downwardly relative to the plates. Aside from the possible danger resulting when the pin/key shears, the shaft may have to be re-bored to remove the remaining pin/key fragment.

Another problem with conventional holders is that it is difficult to consistently set a desired height therefor. It is known to place graduations on the straight shaft portion to provide a frame of reference between the plates and holder. The graduations may be painted on, or defined by bores, as may be provided in a hollow shaft.

The problem with the conventional graduations is that they often become obscured as a result of the severe conditions under which the equipment is operated. The painted graduations may be worn off the shaft as the shaft moves guidingly against the plates. Bores or any depressions in the shaft tend to rapidly fill with dirt, fertilizer, additives, etc. so as to eventually become undetectable.

In the absence of any graduations, or in the event that the graduations become ineffective, the user is required to manually measure the height of each holder. This is a time consuming endeavor and, depending upon the nature of the holder, may be awkward and dangerous. If a single individual attempts to effect the adjustment, he/she must raise the holder, use a tape measure to select the height, maintain that height and tighten the nuts on the plate bolts to fix the position of the holder relative to the plates.

It is also common to limit rotation of the holder about its vertical axis within a predetermined range. This is commonly accomplished by welding a vertically extending rib onto the shaft so that the rib makes keyed connection with the plates to limit rotation of the holder about a vertical axis. The need for the rib introduces another manufacturing step for the holder, which undesirably adds to its costs.

SUMMARY OF THE INVENTION

In one form of the invention, a holder is provided for an agricultural tool. The holder has a shaft with first structure at a first location for mounting at least one agricultural tool to the shaft. The shaft has a portion that is movable guidingly in first and second opposite directions relative to a support on which the holder is mounted. A second structure is integrally formed as one piece with the shaft to limit movement of the shaft portion in one of the first and second directions relative to a support on which the holder is mounted.

The shaft portion with the second structure can be conveniently formed as one solid metal piece by casting or forging. The result is a self-contained piece that obviates the need to separately attach pins or keys to the shaft to limit the movement of the shaft in the first and second directions relative to a support therefor.

In one form, the shaft portion is elongate and has a substantially uniform diameter with a peripheral surface and the second structure projects from the peripheral surface of the shaft portion transversely to the length thereof. In one preferred form, the second structure projects from the peripheral surface through 360° around the shaft portion. This arrangement defines an annular shoulder that can abut to the support for the holder to positively arrest movement of the holder in one of the first and second directions.

In another form of the invention, at least one graduation is pre-formed as one piece with the shaft and projects from the peripheral surface of the shaft to define a frame of reference between the shaft and a support on which the holder is mounted. A plurality of graduations can be provided which are at least one of dimples and numbers.

In another form of the invention, an elongate rib is formed as one piece with the shaft to abut to a support for the holder to limit movement of the shaft in third and fourth opposite directions relative to a support for the holder.

The invention further contemplates the combination of the holder with a support, with the support including first and second plates which cooperatively define a receptacle for the shaft portion which allows the shaft portion to be guidingly moved selectively in the first and second directions for vertical adjustment of at least the part of the shaft on which a tool is mounted.

The elongate rib is constructed to have oppositely facing surfaces that are abuttable to the first and second plates to limit movement of the shaft in the third and fourth opposite directions.

The first and second plates are movable selectively towards and away from each other to allow release and capture of the shaft. The shaft can be held captive between the plates to maintain a tool on the shaft at a desired height.

While the first and second structures can be otherwise located, in one form they are located at opposite ends of the shaft.

In another form of the invention, a holder for an agricultural tool is provided, which holder has a shaft having an elongate shape with first and second ends, with first structure at one of the first and second shaft ends for mounting at least one agricultural tool to the shaft. The shaft has a portion that is movable guidingly in first and second opposite directions relative to a support on which the holder is mounted. Second structure is integrally formed as one piece with the shaft at a location spaced from the one of the first and second shaft ends to limit movement of the shaft portion in one of the first and second directions relative to a support on which the holder is mounted.

The second structure can be formed at the other of the first and second shaft ends.

With the inventive structure, the shaft, including the elongate rib, graduations, and the second structure can be formed, as by forging, from a single, solid, cylindrical, metal blank.

BRIEF DESCRIPTION OF THE DRAWINGS

FIG. 1 is a schematic view of a towing vehicle drawing a support for a plurality of agricultural tool holders which are arranged in side-by-side relationship;

FIG. 2 is a fragmentary side elevation view of a conventional agricultural tool holder carried by a pair of plates on the support;

FIG. 3 is a cross-sectional view of the tool holder and support plates taken along line 3—3 of FIG. 2;

FIG. 4 is a plan view of a shaft on a conventional tool holder with a pin directed therethrough to limit movement of the shaft relative to the support plates;

DETAILED DESCRIPTION OF THE DRAWINGS

Figure 5:
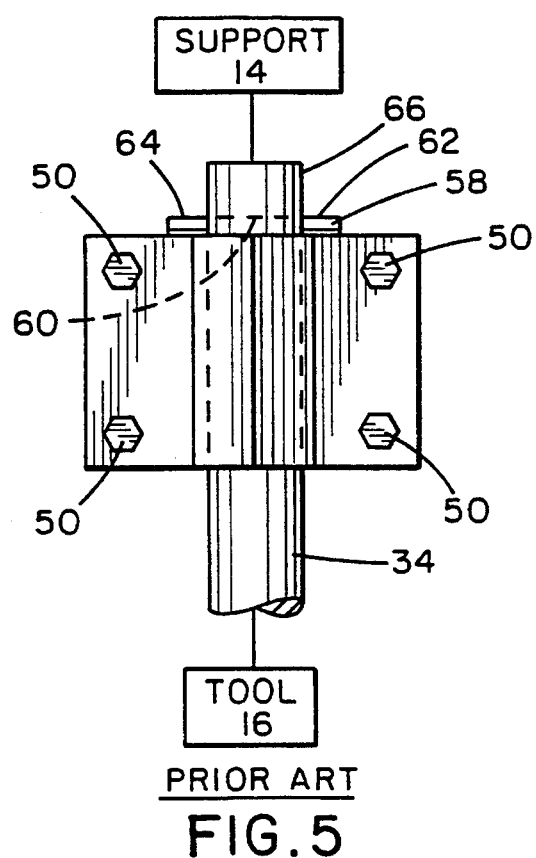
FIG. 5 is a side elevation view of a conventional tool holder mounted to a pair of plates on a support and utilizing the pin in FIG. 4.

In FIG. 1, a system is shown schematically at 10 for treating a strip of soil, as by fertilization, cultivation, residue resituation, etc. The system 10 includes a drawing vehicle 12 for a support 14 to which a plurality of soil working tools 16 are attached to be drawn simultaneously across underlying terrain 18. Tool holders 20 are mounted to the support 14, with there being one or a plurality of tools 16 mounted to each such holder 20.

Figure 14:
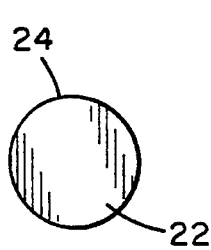
FIG. 14 is a side elevation view of one type of agricultural tool that can be mounted from a support using the inventive holder.
Figure 15:
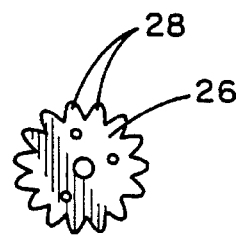
FIG. 15 is a side elevation view of another type of agricultural tool that can be mounted from a support using the inventive holder.
Figure 16:
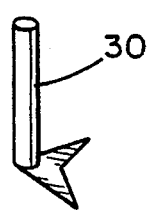
FIG. 16 is a perspective view of another type of agricultural tool that can be mounted from a support using the inventive holder.
Figure 17:
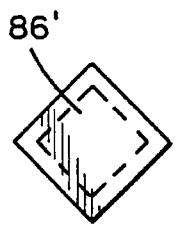
FIG. 17 is a plan view of a modified form of shaft on the inventive tool holder.

The nature of the tools 16 may vary considerably. Three suitable tools are shown in FIGS. 14–16. It should be understood that these tools are only exemplary and should not be viewed as limiting, since any tool that can be used to treat soil in any manner is contemplated to be held by the holders 20.

In FIG. 14, a solid disk 22 is shown. The disk 22 has a peripheral cutting edge 24 which can be used to part soil as it moves therethrough. The disk 22 can be vertically oriented so as to define a narrow opening in underlying soil or angularly positioned to effect parting of the soil.

In FIG. 15, a wheel 26 is shown having equidistantly spaced teeth around the periphery thereof. This wheel 26, and one suitable application therefor, are described in my U.S. Pat. No. 5,129,282, which is incorporated herein by reference.

In FIG. 16, a soil parting knife 30 is shown. The knife is used to break up soil beneath the surface, as to facilitate the application of an additive. One such knife 30 is shown in my U.S. Pat. No. 5,240,080, which is incorporated herein by reference.

Certain conventional holders for attaching the tool 16 to the support 14 are shown in FIGS. 2–8. In its simplest state, the conventional tool holder, shown at 32 in FIGS. 2 and 3, consists of a substantially straight, solid steel shaft 34, which is held captively between cooperating plates 36, 38 on the support 14. One of the plates 36, 38 may be permanently held in place on the support 14, as by welding. The plates 36, 38 have offset wall portions 40, 42, which define U- or V-shaped surfaces 44, 46, that cooperatively bound a receptacle 48 in which the shaft 34 can be guided vertically relative to the plates 36, 38. The receptacle 48 could be similarly defined by an offset wall portion on only one of the plates 36, 38 with the other of the plates 36, 38 being flat. A plurality of bolts 50 are directed through the plates 36, 38 and have nuts 52 threaded thereon. By tightening the bolts 50, the plates are drawn towards each other to restrict the size of the receptacle 48.

The offset wall portions 40, 42 are configured so that with the bolts 50 loosened, the plates 36, 38 can be moved apart from each other sufficiently to allow the upper free end 54 of the shaft 34 to be directed into the receptacle 48 and guided vertically to a position wherein the shaft free end 54 is exposed above the top edges 56 of the plates 36, 38. When the desired height of the shaft 34 is realized, the bolts 50 are tightened to captively squeeze the shaft 34 to maintain it at its desired height.

An optional set bolt 57 can be threaded through the plate 36 to be borne directly against the shaft 34.

Figure 8:
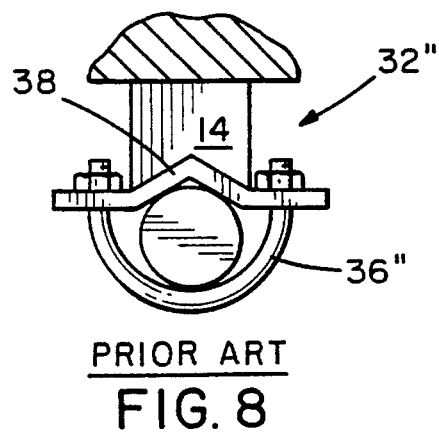
FIG. 8 is a plan view of a conventional tool holder mounted to a support plate using U-bolts.
Figure 7:
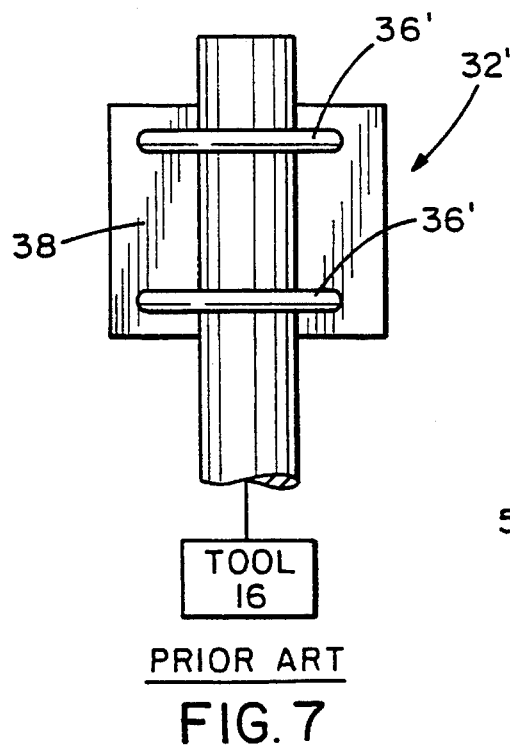
FIG. 7 is a side elevation view of a conventional tool holder mounted to a support plate using a pair of formed straps.
Figure 9:
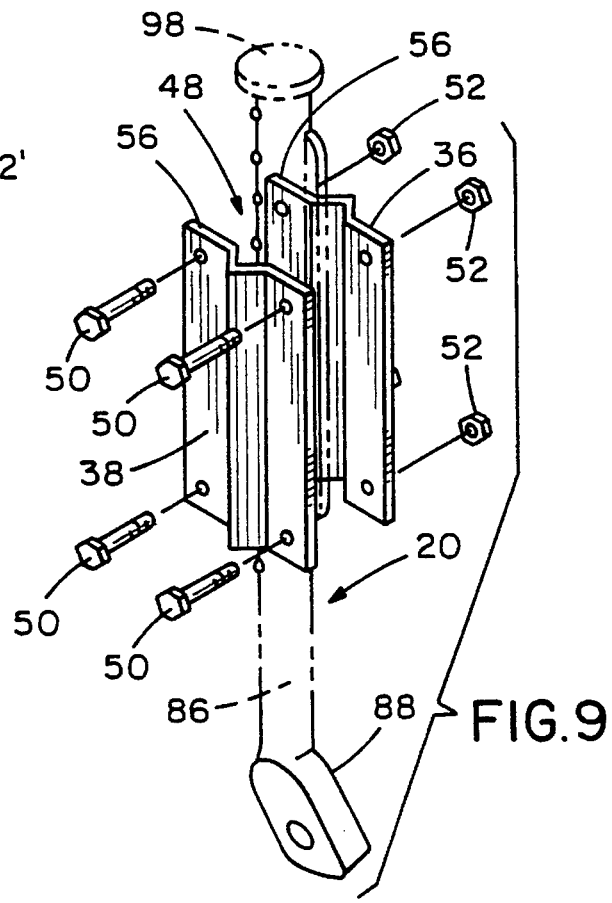
FIG. 9 is an exploded perspective view of an agricultural tool holder, according to the present invention, in relationship to a pair of mounting support plates.
Figure 10:
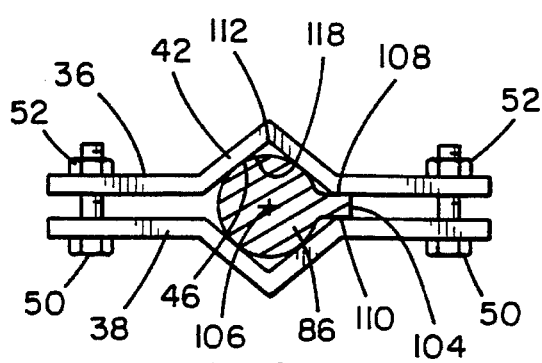
FIG. 10 is a plan view of the inventive tool holder operatively mounted to the support plates.

FIGS. 7 and 8 show modified forms of conventional tool holders 32', 32" wherein formed straps 36' and U-bolts 36" are used in place of the plate 36 to hold the shaft 34 fixedly against the plate 38. The straps 36' and U-bolts 36" function in the same manner as the plate 38. Thus, the use of the word "plate" herein is intended to be generic to the plates 36, the straps 36' and the U-bolts 36".

The difficulty with this type of arrangement is that the shaft 34 can fall freely through the receptacle 38 and separate fully from the support 14. This may be dangerous to the individual who is attempting to effect assembly and/or adjustment of the tool holder 32.

Another problem with the tool holder 32 is that in the absence of any graduations thereon, or the obscuring of any graduations that may have been placed on, as by painting, or the like, the installer must measure the amount of projection of the shaft free end 54 above the plates 36, 38 to determine the running height of the tools on the tool holder 32. Once the desired amount of upward extension is achieved, the bolts 50 must then be tightened. This may be an awkward operation and one that is potentially dangerous should the holder 32 inadvertently release from the plates 36, 38.

To prevent the inadvertent passage of the shaft 34 downwardly through the receptacle 48, a stop pin 58 can be provided. The stop pin 58 is directed into a bore 60 passing fully through the shaft 34 transversely to its length. The stop pin 58 has ends 62, 64 that project radially from the peripheral surface 66 of the shaft 34 to abut to the plates 34, 36 to limit downward movement of the shaft 34.

To avoid unnecessary weakening of the shaft 34, the bore 60 is made with a relatively small diameter. Consequently, the stop pin 58 is limited in dimension. As a result, it be prone to shearing as when the shaft 34 moves abruptly in a downward direction, causing the pin 58 to encounter the top edges 56 of the plates 36, 38.

Figure 6:
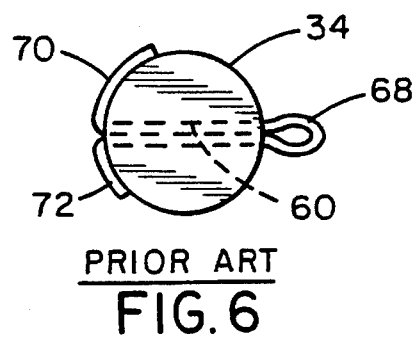
FIG. 6 is a plan view of a conventional shaft with a deformable key substituted for the pin in FIGS. 4 and 5.

In FIG. 6, a deformable key 68 is shown in place of the stop pin 58. The key 68 is extended through the bore 60 in the shaft 34 and has legs 70, 72 bent oppositely to be wrapped against the peripheral surface 66 of the shaft 34 to prevent withdrawal thereof from the bore 60. The key 68 defines an enlargement that abuts to the top edges 56 of the plates 36, 38 to limit downward movement of the shaft 34 relative to the support 14.

The shaft 34 in FIG. 4 is further modified by fixing an elongate rib 74 to the peripheral surface 66 thereof. The rib 74 has a generally rectangular cross section and extends substantially parallel to the length of the shaft 34. The rib 74 is fixed in place by one or more weld lines 76, 78. The rib 74 has oppositely facing surfaces 80, 82 which abut to the plates 36, 38 to limit rotation of the shaft 34 in opposite directions about its axis 84 relative to the plates 36, 38.

Since the rib 74 is welded in place, a separate manufacturing step is required. Additionally, the welding process may adversely alter the characteristics of the metal from which the shaft 34 is made.

The present invention overcomes the above problems. The inventive tool holder 20 is shown in detail in FIGS. 9–13 and 17 The inventive tool holder 20 includes an elongate shaft 86 having means 88 at one end thereof for mounting an agricultural tool 90.

The tool 90 is mounted to a hub assembly 92 which is fixed to the means 88, in this case an offset end, by a bolt 94, which extends through the offset end. The hub assembly 92 allows the tool to rotate freely about its central axis 96.

The shaft 86 is configured to move guidingly within the receptacle 48 defined by the support plates 36, 38 in a vertical direction, substantially in the same manner as the shaft 34 moves relative to the plates 36, 38. According to the invention, means are provided at 98 to limit movement of the shaft 86 vertically downwardly past the top edges 56 of the plates 36, 38. The means 98 is a radial enlargement extending through substantially 360° around the peripheral surface 100 of the shaft 86. The means 98 defines an annular shoulder 102 to abut to the plate top edges 56 to thereby arrest the downward movement of the shaft 86 with the plates 36, 38 drawn together in a snug but not tightened relationship around the shaft 86.

In a preferred form, the enlargement 98 is formed as one piece with the shaft 86. This can be accomplished by forming the shaft 86 as by casting or a forging process.

The enlargement 98 provides a positive stop to prevent inadvertent movement of the shaft 86 fully downwardly through the plates 36, 38. At the same time, the enlargement 98 can be formed by the same process in which the shaft 86 is formed, thereby obviating the need for extra manufacturing steps as is common to the prior art.

Another aspect of the invention is the inclusion of an elongate rib 104 which extends substantially parallel to the lengthwise axis 106 of the shaft 86. The rib 104 has oppositely facing surfaces 108, 110, which abut to the plates 36, 38, respectively, to limit rotation of the shaft 86 relative to the plates 36, 38 in opposite directions about the shaft axis 106.

In a preferred form, the rib 104 is integrally formed as one piece with the shaft 86. Again, this one piece formation can be accomplished through casting or a forging process. This obviates the need to have to weld a separate element to the shaft 86 as requires an extra manufacturing step and may compromise the integrity of the shaft 86.

A further aspect of the invention is the provision of graduations 112, 114 on the shaft 86 in such a manner that the graduations 112, 114 remain identifiable even after prolonged use of the holder 20. More particularly, the graduations 112 are defined as dimples which project radially outwardly from the peripheral surface 116 of the shaft 86. The graduations 112 are defined at regularly spaced intervals. The height of the holder 20 can be ascertained by identifying the number of graduations 112 that are visible above the top edges 56 of the plates 36, 38.

In a preferred form, the dimples 112 are formed as one piece with the shaft 86. This can be accomplished by the aforementioned casting and forging procedures.

To further facilitate adjustment of the shaft 86, the graduations 114 can be formed as numbers projecting from the peripheral shaft surface 116 to be visible above the top edges 56 of the plates 36, 38. The graduations 114 are likewise preferably formed as one piece with the shaft 86 through, for example, casting or a forging process.

Figure 11:
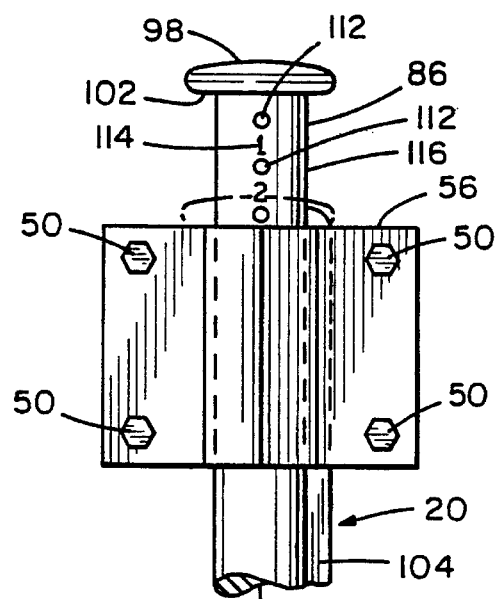
FIG. 11 is an enlarged, side elevation view of the inventive tool holder operatively mounted to the support plates.
Figure 12:
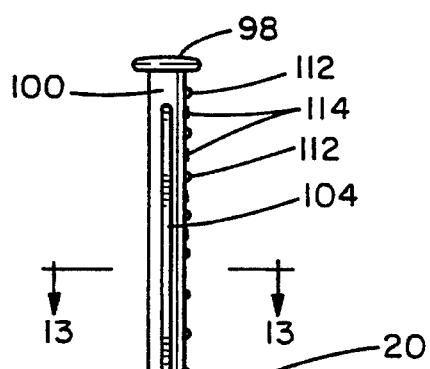
FIG. 12 is an end elevation view of the inventive tool holder with an agricultural tool operatively associated therewith.
Figure 13:
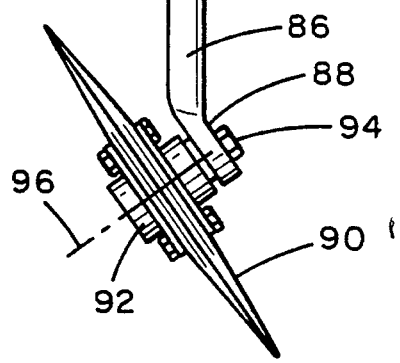
FIG. 13 is an enlarged, cross-sectional view of a shaft on the inventive tool holder taken along line 13—13 of FIG. 12.

The graduations 112 can be formed to reside in the base 118 of the U-, V-shaped surface 46 or could be slightly offset therefrom, as shown in phantom lines in FIG. 11, so that they bind with the offset wall portion 42 with the shaft 86 in an operative position relative to the support plates 36, 38.

With the inventive structure, it is possible, with one cylindrical blank, to form the shaft 86, the offset 88, the graduations 112, 114, the rib 104 and the enlargement 98 as one piece. Although it is preferred, it is not necessary that the shaft 86 have the uniform circular cross section as shown for its upper portion. The shaft could also have other than a circular cross section. For example, in FIG. 17, a square shaft 86' is shown. Other non-circular shapes are contemplated and may facilitate a keyed connection between the shaft 86, 86' and cooperating support plates 36, 38.

The foregoing disclosure of specific embodiments is intended to be illustrative of the broad concepts comprehended by the invention.

I claim:

1. An agricultural tool holder assembly, comprising:

a support forming a passageway therethrough and being operable in a capturing position and a releasing position;

an agricultural tool holder forged from a single, continuous metal blank, said tool holder including, an elongated shaft including an upper end, a lower end, and a peripheral surface bridging said upper and lower ends, said shaft extending through said passageway along a lengthwise axis such that said upper end is disposed above said support and said lower end is disposed below said support, said shaft being fixed relative to said support while said support is in said capturing position and being movable relative to said support while said support is in said releasing position, an enlarged head disposed at said upper end of said shaft, said enlarged head projecting radially outwardly from and substantially encompassing said peripheral surface to prevent said upper end of said shaft from moving downward along said lengthwise axis into said passageway, keying means for engaging said support to limit rotation of said shaft relative to said support about said lengthwise axis while said support is in said capturing position, and a mounting portion disposed in proximity to said lower end of said shaft; and an agricultural tool mounted to said mounting portion of said agricultural tool holder.

2. The assembly of claim 1, wherein said support includes first and second opposing support plates connected to each other and cooperatively forming said passageway therebetween.

3. The assembly of claim 1, wherein said tool holder further includes one or more height markings projecting radially outwardly from said peripheral surface to define a frame of reference of said shaft relative to said support.

4. The assembly of claim 3, wherein said support and said peripheral surface of said shaft cooperatively form a gap therebetween, said height markings being disposed on said peripheral surface so as to reside in said gap.

5. The assembly of claim 1, wherein said mounting portion is tilted relative to said lengthwise axis.

6. The assembly of claim 5, wherein said agricultural tool is a toothed wheel.

7. The assembly of claim 1, wherein said keying means includes a rib projecting radially outwardly from said peripheral surface of said shaft, said rib being generally parallel to said lengthwise axis.

8. The assembly of claim 1, wherein said shaft has a non-circular cross-section so as to form said keying means.

* * * * *